US012795680B2

(12) United States Patent
Li

(10) Patent No.: US 12,795,680 B2
(45) Date of Patent: Nov. 10, 2026

(54) TRANSMISSION CONFIGURATION INDICATION STATE DETERMINATION METHOD AND APPARATUS, AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 274 days.

(21) Appl. No.: 18/704,771

(22) PCT Filed: Oct. 29, 2021

(86) PCT No.: PCT/CN2021/127594
§ 371 (c)(1),
(2) Date: Apr. 25, 2024

(87) PCT Pub. No.: WO2023/070562
PCT Pub. Date: May 4, 2023

(65) Prior Publication Data
US 2025/0008517 A1 Jan. 2, 2025

(51) Int. Cl.
*H04W 72/23* (2023.01)
*H04B 7/06* (2006.01)

(52) U.S. Cl.
CPC ........ *H04W 72/23* (2023.01); *H04B 7/06968* (2023.05)

(58) Field of Classification Search
CPC .. H04W 72/23; H04W 72/04; H04B 7/06968; H04B 7/0695; H04L 5/0053
See application file for complete search history.

(56) References Cited

U.S. PATENT DOCUMENTS

2021/0321442 A1 10/2021 Jung et al.
2023/0076897 A1* 3/2023 Svedman .............. H04L 5/0053
(Continued)

FOREIGN PATENT DOCUMENTS

CN 112771970 A 5/2021
CN 113225818 A 8/2021
(Continued)

OTHER PUBLICATIONS

ASUSTeK, "Correction on physical downlink control channel", 3GPP TSG RAN WG1 # 96bis, R1-1905116, Xian, China, Apr. 8-Apr. 12, 2019.
(Continued)

*Primary Examiner* — Abdullahi Ahmed
(74) *Attorney, Agent, or Firm* — Volpe Koenig

(57) ABSTRACT

A method and apparatus for improving scheduling in a wireless communication network. The scheduling is improved by: receiving first configuration information, where the first configuration information is configured to configure at least two SS sets having a link relation, and CORESETPoolIndexes of CORESETs corresponding to two of the at least two SS sets are different; determining an MAC CE, where the MAC CE is configured to indicate at least one TCI state corresponding to each code point in at least one code point, in response to determining that the at least one code point is configured to appear, the state is carried in a transmission configuration indication field of DCI, the DCI being transmitted by PDCCH candidates in the at least two SS sets having the link relation; and determining a default TCI state of a PDSCH scheduled by the DCI.

18 Claims, 6 Drawing Sheets

(56) References Cited

U.S. PATENT DOCUMENTS

| | | | | |
|---|---|---|---|---|
| 2024/0023101 | A1* | 1/2024 | Gao | H04L 5/0055 |
| 2024/0089986 | A1* | 3/2024 | Matsumura | H04W 72/0446 |
| 2024/0237118 | A9* | 7/2024 | Jung | H04B 7/06 |
| 2024/0372679 | A1* | 11/2024 | Zhu | H04L 5/0053 |
| 2024/0407037 | A1* | 12/2024 | Matsumura | H04B 7/06968 |

FOREIGN PATENT DOCUMENTS

| | | | |
|---|---|---|---|
| WO | 2020230243 | A1 | 11/2020 |
| WO | 2021163408 | A1 | 8/2021 |
| WO | 2021212456 | A1 | 10/2021 |

OTHER PUBLICATIONS

Moderator (Qualcomm, "Summary #1 of email discussions [104b-e-NR-feMIMO-02] for mTRP PDCCH enhancements", 3GPP Tsg-Ran WG1 Meeting #104-bis-e, R1-2103819, e-Meeting, Apr. 12-Apr. 20, 2021.

* cited by examiner

2000

| | | | |
|---|---|---|---|
| R | Serving Cell ID | BWP ID | Oct 1 |
| $C_0$ | TCI state $ID_{0,1}$ | | Oct 2 |
| R | TCI state $ID_{0,2}$ | | Oct 3 (Optional) |
| | … | | |
| $C_N$ | TCI state $ID_{N,1}$ | | Oct M-1 |
| R | TCI state $ID_{N,2}$ | | Oct M (Optional) |

TRANSMISSION CONFIGURATION INDICATION STATE DETERMINATION METHOD AND APPARATUS, AND STORAGE MEDIUM

CROSS-REFERENCE TO RELATED APPLICATION

The present application is a U.S. National Phase of International Patent Application Serial No. PCT/CN2021/127594 filed on Oct. 29, 2021. The contents of the above-cited application are hereby incorporated by reference in its entirety for all purposes.

BACKGROUND OF THE INVENTION

In the New Radio (NR) technology, for example, when a communication band is in frequency range 2, beam-based (beam) transmission and reception are required to ensure coverage due to the fast fading of a high-frequency channel. When a network device (for example, a base station) has multiple transmission reception points (TRPs), services can be provided for a terminal using the TRPs. For example, a physical downlink control channel (PDCCH) is transmitted to the terminal by using the TRPs.

SUMMARY OF THE INVENTION

To solve the existing problems in the related art, the disclosure provides a method and apparatus for determining a transmission configuration indication (TCI) state, as well as a storage medium.

According to a first aspect of the disclosure, a method for determining a TCI state is provided. The method is performed by a terminal, and includes: receiving first configuration information, where the first configuration information is configured to configure at least two search space sets having a link relation, and control resource set pool indexes of control resource sets corresponding to two of the at least two search space sets are different; determining a medium access control control element (MAC CE), where the MAC CE is configured to indicate at least one TCI state corresponding to each code point in at least one code point, in response to determining that the at least one code point is configured to appear, the state is carried in a TCI field of downlink control information (DCI), and the DCI is transmitted by physical downlink control channel (PDCCH) candidates in the at least two search space sets having the link relation; and determining a default TCI state of a physical downlink shared channel (PDSCH) scheduled by the DCI.

According to a second aspect of the disclosure, a method for determining a TCI state is provided. The method is performed by a network device, and includes: transmitting first configuration information, where the first configuration information is configured to configure at least two search space sets having a link relation, and control resource set pool indexes of control resource sets corresponding to two of the at least two search space sets are different; determining a medium access control control element (MAC CE), where the MAC CE is configured to indicate at least one TCI state corresponding to each code point in at least one code point, in response to determining that the at least one code point is configured to appear, the state is carried in a TCI field of downlink control information (DCI), and the DCI is transmitted by physical downlink control channel (PDCCH) candidates in the at least two search space sets having the link relation; and determining a default TCI state of a physical downlink shared channel (PDSCH) scheduled by the DCI.

According to a third aspect of the disclosure, an apparatus for determining a TCI state is provided. The apparatus includes: one or more processors; and a memory configured to store a processor-executable instruction; where one or more processors are collectively configured to execute the method for determining a TCI state in the first aspect.

According to a fourth aspect of the disclosure, an apparatus for determining a TCI state is provided. The apparatus includes: one or more processors; and a memory configured to store a processor-executable instruction; where the one or more processors are collectively configured to execute the method for determining a TCI state in the second aspect.

According to a fifth aspect of the disclosure, a non-transitory computer storage medium is provided. The non-transitory storage medium stores an instruction that causes the method in the first aspect to be implemented when executed.

According to a sixth aspect of the disclosure, a non-transitory computer storage medium is provided. The non-transitory storage medium stores an instruction that, when executed, causes the method in the second aspect to be implemented.

It is to be understood that both the foregoing general description and the following detailed description are illustrative and interpretative and are not restrictive of the disclosure.

BRIEF DESCRIPTION OF DRAWINGS

The accompanying drawings are incorporated in the description as a constituent part of the description, illustrate examples conforming to the disclosure, and serve to explain the principles of the disclosure together with the specification.

DETAILED DESCRIPTION OF THE INVENTION

A description will be made in detail, with examples here, instances of which are illustrated in the accompanying drawings. When the following description relates to the accompanying drawings, the same numbers in different accompanying drawings refer to the same or similar elements unless otherwise indicated. The embodiments described in the following examples do not represent all embodiments consistent with the disclosure.

The disclosure relates to the technical field of communication, and in particular to a method and apparatus for determining a transmission configuration indication (TCI) state, as well as a storage medium.

In the New Radio technology, for example, when a communication band is in frequency range 2, beam-based transmission and reception are required to ensure coverage due to the fast fading of a high-frequency channel. When a network device (for example, a base station) has multiple TRPs, services can be provided for a terminal using the TRPs. For example, a PDCCH is transmitted to the terminal by using the TRPs.

Multi-TRP PDCCH repetition is supported in related arts. For example, in the Multi-TRP PDCCH repetition, two control resource sets (CORESETs) are configured, and corresponding TCI states of the CORESETs are configured. Each CORESET is configured with a TCI state correspondingly, and a search space set (SS set) is configured to be associated with two CORESETs separately. That is, two SS sets with a link relation are configured to associate with different CORESETs and correspond to different TCI states. The two SS sets having a link relation can be understood as two PDCCH candidates with the same PDCCH candidate index in the two SS sets are configured to transmit one piece of downlink control information (DCI). In a traditional approach, two TCI states of PDSCH repetition are indicated based on single downlink control information (S-DCI). For example, the CORESET pool indexes of CORESETs corresponding to all DCIs are the same.

However, when the CORESET pool indexes of the CORESETs corresponding to a plurality of SS sets having link relations configured for PDCCH repetition are different, and the TCI state of the PDSCH transmission is configured using different mechanisms, how the default TCI state of a PDSCH scheduled by the PDCCH is to be determined is the problem that needs to be solved.

Figures 1, 2:
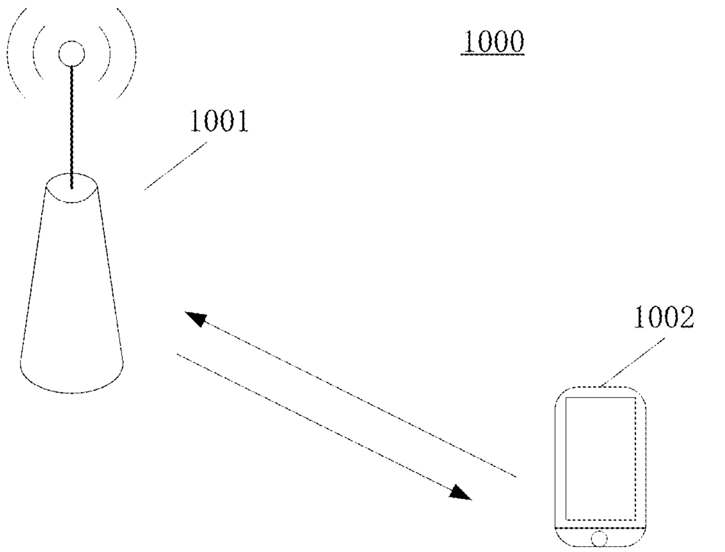
FIG. 1 is a schematic diagram of a radio communication system according to an example.
FIG. 2 is a format diagram of a medium access control control element (MAC CE) under a single downlink control information (S-DCI) mechanism.

A method provided in an example of the disclosure may be used in a radio communication system 1000 as shown in FIG. 1. With reference to FIG. 1, the radio communication system 1000 includes a terminal 1002 and a network device 1001. The terminal 1002 is connected with the network device 1001 by means of a radio resource to transmit and receive data.

It may be understood that the radio communication system 1000 as shown in FIG. 1 is merely illustrative and may also include other network devices, for instance, core network devices, radio relay devices, radio backhaul devices, etc., which are not depicted in FIG. 1. The example of the disclosure does not limit the number of network devices and the number of terminals included in the radio communication system 1000.

It may be further understood that the radio communication system according to the example of the disclosure is a network providing a radio communication function. The radio communication system may use different communication technologies, for instance, code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Networks may be classified into 2nd generation (2G) networks, 3G networks, 4G networks, or future evolved networks, for instance, 5G networks, according to factors of capacity, rate, latency, etc. of different networks. The 5G networks may also be referred to as new radio (NR) networks. For convenience of description, the disclosure sometimes refers to a radio communication network simply as a network.

Further, the network device 1001 involved in the disclosure may also be referred to as a radio access network device. The radio access network device may be a base station, an evolved node B (eNB), a home base station, an access point (AP) in a wireless fidelity (WIFI) system, a radio relay node, a radio backhaul node, a transmission point (TP), a transmission and reception point (TRP), etc., may be a gNB in an NR system, or may be a component or some of devices constituting a base station, etc. When serving as a vehicle-to-everything (V2X) communication system, the network device may also be vehicle-mounted. It is to be understood that an example of the disclosure does not limit a particular technology and a particular device configuration used by the network device.

Further, a terminal 1002 involved in the disclosure may also be referred to as a terminal device, user equipment (UE), a mobile station (MS), a mobile terminal (MT), etc., and is a device that provides a user with speech and/or data connectivity. For instance, the terminal may be a handheld device, a vehicle-mounted device, etc., which has a radio connection function. In some instances, the terminal includes a mobile phone, a pocket personal computer (PPC), a palmtop computer, a personal digital assistant (PDA), a laptop computer, a portable Android device, a wearable device, a vehicle-mounted device, etc. Moreover, when being a vehicle-to-everything (V2X) communication system, the terminal device may also be a vehicle-mounted device. It is to be understood that an example of the disclosure does not limit a particular technology and a particular device configuration used by the terminal.

In the disclosure, data transmission is performed between a network device and a terminal based on beams. During beam-based data transmission, the network device (for example, a base station) may transmit a physical downlink control channel (PDCCH) to the terminal by using a plurality of TRPs (also referred to as multi-TRPs). In the related art, when a network device (for example, a base station) transmits a PDCCH to a terminal by using a TRP, a transmission configuration indication (TCI) state for receiving the PDCCH is configured for the terminal. For example, a configuration method includes: configuring a control resource set (CORESET), such as CORESET #1, for the terminal, and configuring a TCI state used by the terminal correspondingly when receiving a PDCCH in a CORESET #1 resource to be TCI #1, and configuring a search space set (SS set) for the terminal, which is associated with CORESET #1. When receiving the PDCCH on the resource in the SS set, the terminal uses a beam corresponding to TCI #1 for reception. Currently, each SS set can only be associated with one CORESET, and each CORESET can only be configured with one TCI state.

In the disclosure, data transmission is performed between a network device and a terminal based on beams. During beam-based data transmission, when the network device (for example, a base station) transmits a PDCCH to the terminal by using a plurality of TRPs (also referred to as multi-TRPs), different TRPs are transmitted by using different beams. The plurality of TRPs may transmit the same PDCCH.

In order to implement that the plurality of TRPs transmit the same PDCCH, a current method includes: configuring two CORESETs, where each CORESET is correspondingly configured with a TCI state, and configuring SS sets to be associated with the two CORESETs respectively. That is, two SS sets are configured, associating different CORESETs and corresponding different TCI states. There is also an association between PDCCH candidates of two SS sets having an association. For example, SS set #1 and SS set #2 are associated, then PDCCH candidate #i in SS set #1 is associated with PDCCH candidate #i of SS set #2. For example, two PDCCH candidates with the same index are configured to transmit the same DCI.

An application scene in which a plurality of TRPs transmit the same PDCCH is multi-TRP PDCCH repetition. In the multi-TRP PDCCH repetition, two CORESETs are configured, and corresponding TCI states of the CORESETs are configured. Each CORESET corresponds to one TCI state, and two SS sets having a link relation are configured, associating different CORESETs and corresponding different TCI states. The two SS sets having a link relation can be understood as two PDCCH candidates with the same PDCCH candidate index in the two SS sets are configured to transmit one piece of DCI.

In a traditional method, a single DCI (S-DCI) mechanism is supported to indicate a TCI state. For example, CORESET pool indexes of CORESETs corresponding to all DCI are the same. In the related art, a multi-DCI (M-DCI) mechanism is also supported to indicate a TCI state. For example, CORESET pool indexes of CORESETs corresponding to different DCIs may be different. Moreover, the configuration of a default TCI state of a PDSCH is also performed in the S-DCI mechanism and the M-DCI mechanism.

The S-DCI mechanism and the M-DCI mechanism are described below first.

In the S-DCI mechanism, all CORESETs correspond to a CORESET pool index of 0 or are configured with no CORESET pool index value. Each code point in a TCI domain in DCI signaling may correspond to at most two TCI states, where a corresponding relation is determined by a medium access control (MAC) control element (CE), and different TRPs do not need to be distinguished. FIG. 2 is a format 2000 diagram of a medium access control control element (MAC CE) under a single downlink control information (S-DCI) mechanism. As shown in FIG. 2, two subscripts i and j are provided below a TCI state ID. i identifies a code point with 3 bits of a TCI field in the DCI corresponding to the TCI state ID. For example, i is 0 to correspond to code point 000; and i is 1 to correspond to code point 001. The subscript j identifies that the TCI state ID is a jth TCI state ID of at least one TCI state ID corresponding to an ith code point. For example, j is 1 to identify a first TCI state ID, and j is 2 to identify a second TCI state ID. In a case where the subscripts are 0, 1, the subscripts identify the first TCI state ID corresponding to code point 000. With reference to FIG. 2, under the S-DCI mechanism, each code point may correspond to at most two TCI states. For example, different TRPs.

In the S-DCI mechanism, a default beam of the PDSCH, which may also be referred to as a default TCI state, may include the following A and B.

A: In a case that an interval between a PDCCH and a PDSCH scheduled by the PDCCH is less than the time duration for quasi co-location (QCL), in an embodiment, in response to determining that two default TCI states are not enabled, QCL indicated by the default TCI state is the same as quasi co-location (or quasi co-located, QCL) of a CORESET with a minimum CORESET ID in a latest slot where a PDCCH candidate needs monitoring. In another embodiment, in response to determining that two default TCI states are enabled, the default TCI state is the same as two TCI states corresponding to a minimum code point in all code points corresponding to two TCI states in a TCI domain.

B: In a case that the interval between the PDCCH and the PDSCH scheduled by the PDCCH is greater than or equal to the time duration for QCL, and no TCI field exists in the DCI, the QCL indicated by the default TCI state is the same as the quasi co-location (QCL) of a CORESET scheduling the PDSCH.

In the M-DCI mechanism, some CORESETs correspond to CORESET pool index 0, and some CORESETs correspond to CORESET pool index 1. Each code point in the TCI domain in the DCI signaling may correspond to at most one TCI state. TCI states corresponding to code points in TCI domains of CORESETs in different CORESET pool indexes are determined by different MAC CEs.

Figure 3:
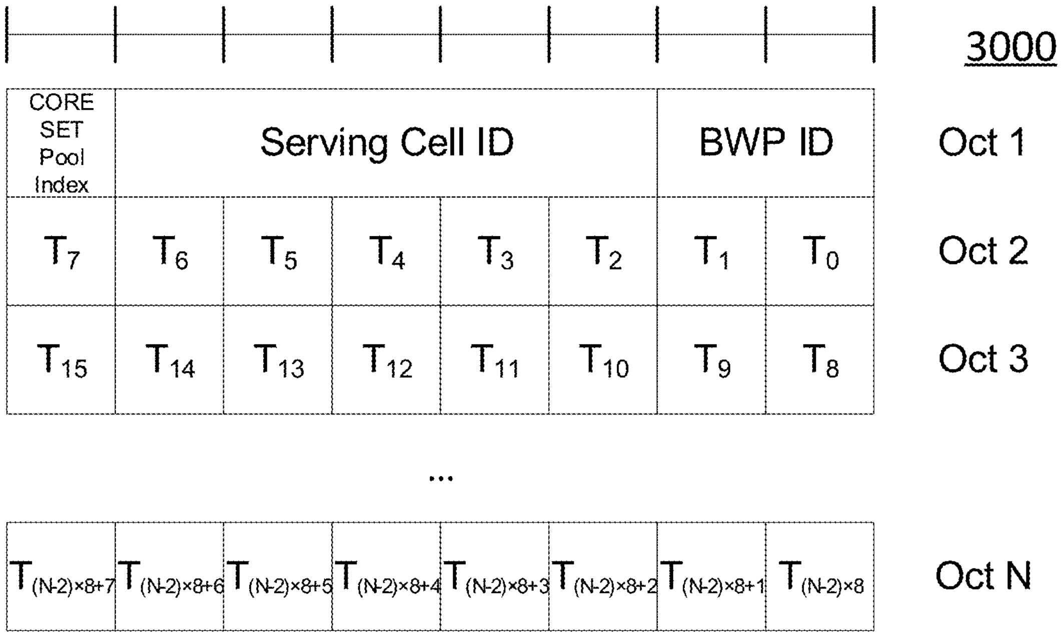
FIG. 3 is a format diagram of an MAC CE under a multi-DCI (M-DCI) mechanism.

In the M-DCI mechanism, the MAC CE includes a CORESET pool index and up to 8 TCI states that need to be activated. FIG. 3 is a format 3000 diagram of a MAC CE under a multi-DCI (M-DCI) mechanism. As shown in FIG. 3, the MAC CE includes a CORESET pool index. The MAC CE indicates a TCI state corresponding to a code point of a TCI field of at least one CORESET DCI included in the CORESET pool index that is included. FIG. 3 shows a plurality of Ti, and i identifies a TCI state ID in radio resource control (RRC) signaling. In a case where a bit position of Ti is 1, it is indicated that the TCI state ID is activated. For example, for CORESET pool index 0, the MAC CE activates TCI state #0, TCI state #4, TCI state #5, TCI state #12, TCI state #14, TCI state #26, TCI state #34, and TCI state #40, which correspond to code points 000, 001, 010, 011, 100, 101, 110, and 111 of TCI fields of DCI of CORESET #0 and CORESET #1 (a CORESET pool index of the two CORESETs is 0) respectively. For another example, for CORESET pool index 1, the MAC CE activates TCI state #70, TCI state #74, TCI state #75, TCI state #82, TCI state #84, TCI state #96, TCI state #104, and TCI state #108, which correspond to code points of TCI fields of DCI of CORESET #2 and CORESET #3 (a CORESET pool index of the two CORESETs is 1), respectively.

In the M-DCI mechanism, the default beam of the PDSCH, which may also be referred to as a default TCI state, may include the following.

A: In a case that the interval between a PDCCH and a PDSCH scheduled by the PDCCH is less than the time duration for QCL, enabling a default TCI-state perCORESET pool index needs to be configured, and QCL indicated by the default TCI state is the same as QCL of a CORESET with a minimum CORESET ID in the CORESETs, with the same CORESET pool index, corresponding to a CORESET scheduling the PDSCH in the latest slot where a PDCCH candidate needs monitoring.

B: In a case that the interval between the PDCCH and the PDSCH scheduled by the PDCCH is greater than or equal to the time duration for QCL, and no TCI field exists in the DCI, the QCL indicated by the default TCI state is the same as the QCL of a CORESET scheduling the PDSCH.

However, when the CORESET pool indexes of CORESETs corresponding to a plurality of SS sets having a link relation for PDCCH repetition are different, TCI states corresponding to code points of TCI fields in DCI carried by PDCCH candidates in the plurality of SS sets having a link relation may be configured based on the S-DCI mechanism for physical downlink shared channel (PDSCH) transmission scheduled by the PDCCH, or may be configured based on the multi-downlink control information (multi-DCI, M-DCI) mechanism for PDSCH transmission scheduled by the PDCCH. When the TCI state of the PDSCH transmission is configured using different mechanisms, how the default TCI state of a PDSCH scheduled by the PDCCH is to be determined is the problem that needs to be solved.

The example of the disclosure provides a method for determining a TCI state, to determine the default TCI state of the PDSCH scheduled by the DCI when CORESET pool indexes of CORESETs corresponding to two PDCCH candidates for PDCCH repetition are different.

In an embodiment, in the example of the disclosure, the default TCI state of the PDSCH scheduled by the DCI may be determined based on the MAC CE.

Figure 4:
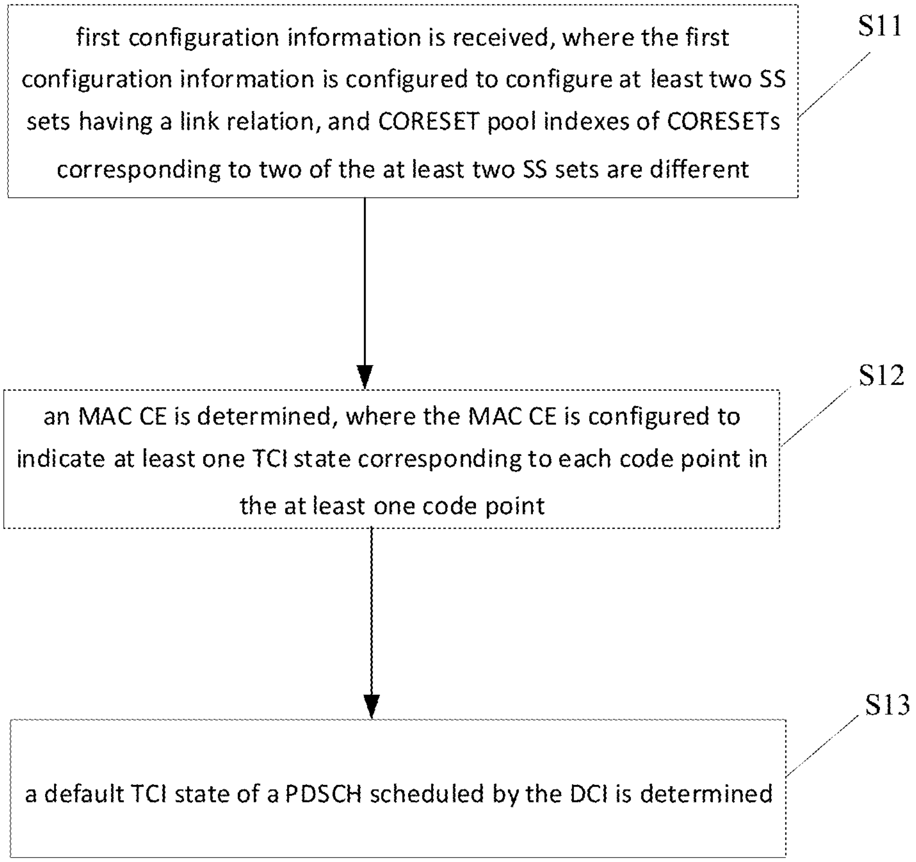
FIG. 4 is a flowchart of a method for configuring a transmission configuration indication (TCI) according to an example.

FIG. 4 is a flowchart of a method for determining a TCI state according to an example. As shown in FIG. 4, the method for determining a TCI state is executed in a terminal and includes steps S11, S12, and S13.

S11, first configuration information is received, where the first configuration information is configured to configure at least two SS sets having a link relation, and CORESET pool indexes of CORESETs corresponding to two of the at least two SS sets are different.

S12, an MAC CE is determined, where the MAC CE is configured to indicate at least one TCI state corresponding to each code point in the at least one code point.

In response to determining that the at least one code point is configured to appear, the state is carried in a TCI field of DCI, the DCI is transmitted by PDCCH candidates in the at least two SS sets having a link relation. It should be noted that the at least one code point is configured to appear can be understood as that the TCI field of the DCI is configured to appear.

S13, a default TCI state of a PDSCH scheduled by the DCI is determined.

In the method for determining a TCI state provided in the example of the disclosure, when the CORESET pool indexes of the CORESETs corresponding to the two SS sets in the at least two SS sets are different, the TCI state of the PDSCH scheduled by the DCI can be determined based on the MAC CE, such that the default TCI state can be determined when the CORESET pool indexes of the CORESETs corresponding to the two SS sets in the at least two SS sets are different.

In an embodiment, the default TC state of the PDSCH scheduled by the DCI in the example of the disclosure may be determined based on at least one of a TCI state indicated by the MAC CE, time duration for QCL, and a time interval between a PDCCH and a PDSCH scheduled by the PDCCH.

In an embodiment, the MAC CE indicates at most one TCI state corresponding to each code point in the at least one code point according to the M-DCI mechanism. When the time interval between the PDCCH and the PDSCH scheduled by the PDCCH is less than the time duration for QCL, the default TCI state of the PDSCH scheduled by the DCI includes a TCI state of a CORESET with a minimum CORESET ID in CORESETs corresponding to the designated CORESET pool index value in the latest time unit in which an SS set needs to be monitored.

The TCI state at least includes QCL Type D, Spatial Rx parameter, etc.

The latest time unit in which an SS set needs to be monitored at least includes one SS set, and a CORESET pool index value of a CORESET associated with the SS set is the designated CORESET pool index value.

It can be understood that the time unit involved in the example of the disclosure may be a slot, a mini-slot, or a span. The span includes a plurality of consecutive symbols or a plurality of consecutive slots.

In an embodiment, the designated CORESET pool index value includes at least one of A-E, as follows.

A: the designated CORESET pool index value is a first index value, where the first index value is a CORESET pool index of a CORESET corresponding to an SS set having no link relation with any other SS sets. For example, the first index value may be 0 or 1.

In an instance, the default TCI state of the PDSCH scheduled by the DCI may be a default TCI state with the CORESET pool index being 0 (where the CORESET pool index being 0 may be configured by radio resource control (RRC) signaling or system default). For example, a QCL parameter indicated by the default TCI state is a QCL parameter of a CORESET with a minimum ID in CORESETs, with CORESET pool indexes being 0, associated with an SS set in the latest time unit in which the search space needs to be monitored.

In another instance, the default TCI state of the PDSCH scheduled by the DCI may be a default beam with the CORESET pool index being 1 (where the CORESET pool index being 1 may be configured by RRC or system default). For example, a QCL parameter indicated by the default TCI state is a QCL parameter of a CORESET with a minimum ID in CORESETs, with CORESET pool indexes being 1, associated with an SS set in the latest time unit in which the search space needs to be monitored.

B: the designated CORESET pool index value is a second index value, where the second index value is different from the CORESET pool index of the CORESET corresponding to the SS set having no link relation with any other SS sets. For example, the second index value may be a newly introduced value other than 0 or 1, for example, 2.

In the example of the disclosure, a CORESET pool index value corresponding to the at least two SS sets having a link relation is the second index value, and alternatively, a CORESET pool index value of a CORESET associated with the at least two SS sets having a link relation is the second index value.

C: the designated CORESET pool index value is a first CORESET pool index value.

The first CORESET pool index is a CORESET pool index of a CORESET associated with an SS set corresponding to a first PDCCH candidate. The first PDCCH candidate is a PDCCH candidate whose transmission time or end time is a designated time in at least two PDCCH candidates for transmitting the DCI, and the designated time includes an earliest time or a latest time.

In an instance, the default TCI state of the PDSCH scheduled by the DCI may be a default TCI state of a CORESET pool index value of a CORESET corresponding to an SS set corresponding to a PDCCH candidate, whose transmission time or end time is earlier or later (where earlier or later time may be system default), for transmitting the DCI.

D: the designated CORESET pool index value is a second CORESET pool index value.

The second CORESET pool index value is a CORESET pool index value of a CORESET associated with an SS set with a minimum SS set identifier in at least two SS sets.

In an instance, the designated CORESET pool index value is determined by the SS set ID. For example, the default TCI state of the PDSCH scheduled by the DCI may be a default TCI state of a CORESET pool index value of a CORESET corresponding to an SS set with a less SS set ID (system default) in the two SS sets.

E: the designated CORESET pool index value is a third CORESET pool index value.

The third CORESET pool index value is a CORESET pool index value corresponding to a CORESET with a minimum CORESET identifier in CORESETs associated with the at least two SS sets.

In an instance, the designated CORESET pool index value is determined by the CORESET ID. For example, the default TCI state of the PDSCH scheduled by the DCI may be a default TCI state of a CORESET pool index value corresponding to a CORESET with a lower CORESET ID (system default) in CORESETs corresponding to the two SS sets.

Further, in an embodiment of the examples of the disclosure, the MAC CE indicates at most one TCI state corresponding to each code point in the at least one code point. When the time interval between the PDCCH and the PDSCH scheduled by the PDCCH is less than the time duration for QCL, a TCI state of a CORESET with a minimum CORESET ID in all CORESETs associated with an SS set in the latest time unit in which an SS set needs to be monitored may be taken as the default TCI state of the PDSCH scheduled by the DCI without distinguishing the CORESET pool indexes.

In an instance, the MAC CE indicates that each code point corresponds to at most one TCI state. When the interval between the PDCCH and the PDSCH is less than the time duration for QCL, the CORESET pool indexes are not distinguished. For example, a QCL parameter indicated by the default TCI state of the PDSCH scheduled by the DCI is a QCL parameter of a CORESET with a minimum ID in CORESETs, with CORESET pool indexes being 0 and 1, associated with an SS set in the latest time unit in which the search space needs to be monitored.

In another embodiment of the disclosure, the MAC CE indicates at most one TCI state corresponding to each code point in the at least one code point according to the M-DCI mechanism. When the time interval between the PDCCH and the PDSCH scheduled by the PDCCH is greater than or equal to the time duration for QCL, and the DCI includes no TCI field, the default TCI state of the PDSCH scheduled by the DCI may include at least one of A or B, as follows.

A: at least one TCI state of at least two TCI states corresponding to the at least two SS sets having a link relation.

B: a TCI state of a first CORESET associated with the at least two SS sets having a link relation. The first CORESET is a CORESET corresponding to a SS set with a minimum SS set identifier in the at least two SS sets, or is a CORESET with a minimum CORESET identifier in CORESETs corresponding to the at least two SS sets.

It can be understood that in the examples involved in the disclosure, the TCI state corresponding to each SS set in the at least two SS sets having a link relation may be, on one hand, the TCI state of the CORESET corresponding to the SS set. The TCI state may also be, on the other hand, the TCI state configured for the SS set. For example, the CORESET is configured with a plurality of TCI states, and the TCI state of each SS set associated with the CORESET is one of the plurality of TCI states.

In yet another embodiment of the example of the disclosure, the MAC CE indicates at most two TCI states corresponding to each code point in the at least one code point according to the S-DCI mechanism, the time interval between the PDCCH and the PDSCH scheduled by the PDCCH is less than the time duration for QCL, and the terminal is configured to enable two default TCI states, such that the default TCI state of the PDSCH scheduled by the DCI may be a first TCI state. The first TCI state is two TCI states corresponding to a minimum code point in all code points of two corresponding TCI states indicated by the MAC CE.

In yet another embodiment of the example of the disclosure, the MAC CE indicates at most two TCI states corresponding to each code point in the at least one code point according to the S-DCI mechanism, but the terminal is not configured to enable two default TCI states, and then the default TCI state of the PDSCH scheduled by the DCI may be similar to the situation involved in the above example that the MAC CE indicates at most one TCI state corresponding to each code point in the at least one code point, and the time interval between the PDCCH and the PDSCH scheduled by the PDCCH is less than the time duration for QCL, which is not described in detail here.

In yet another embodiment of the example of the disclosure, the MAC CE indicates at most two TCI states corresponding to each code point in the at least one code point according to the S-DCI mechanism, the time interval between the PDCCH and the PDSCH scheduled by the PDCCH is greater than or equal to the time duration for QCL, and the default TCI state of the PDSCH scheduled by the DCI may be similar to the situation involved in the above example that the MAC CE indicates at most one TCI state corresponding to each code point in the at least one code point, and the time interval between the PDCCH and the PDSCH scheduled by the PDCCH is greater than or equal to the time duration for QCL, which is not described in detail here.

Furthermore, in an embodiment of the example of the disclosure, the MAC CE is configured to indicate at least two TCI states corresponding to at least one code point in the at least one code point; and each of the at least two TCI states is configured for uplink transmission and/or downlink transmission. That is, both of the at least two TCI states are configured for downlink, both of the at least two TCI states are configured for uplink, some of the at least two TCI states are configured for uplink, and some are configured for downlink, or both of the at least two TCI states are configured for uplink and downlink simultaneously.

It can be understood that in the example of the disclosure, downlink includes a downlink channel and/or a downlink signal. The downlink channel includes at least one of a UE dedicated PDCCH, a non-UE dedicated PDCCH, a UE dedicated PDSCH, a non-UE dedicated PDSCH, and a physical broadcast channel (PBCH). The downlink signal includes at least one of a system resource block (SSB), a channel state information reference signal (CSI-RS) (for CSI measurement and/or beam management), a tracking reference signal (TRS), a phase reference signal (PRS), and a demodulation reference signal (DMRS). The downlink signal may be periodic, semi-persistent, or aperiodic.

Uplink includes an uplink channel and/or an uplink signal. The uplink channel includes at least one of a physical uplink control channel (PUCCH), a physical uplink shared channel (PUSCH), and a physical random access channel (PRACH). The uplink signal includes at least one of a sounding reference signal (SRS), and a demodulation reference signal (DMRS). The SRS is configured for positioning, and/or for beam management, and/or for codebook/non-codebook-based channel measurement or antenna switching. The uplink signal may be periodic, semi-persistent, or aperiodic.

Based on the same concept, the examples of the disclosure further provide a method for determining a TCI state. The method for determining a TCI state is performed by a network device.

Figure 5:
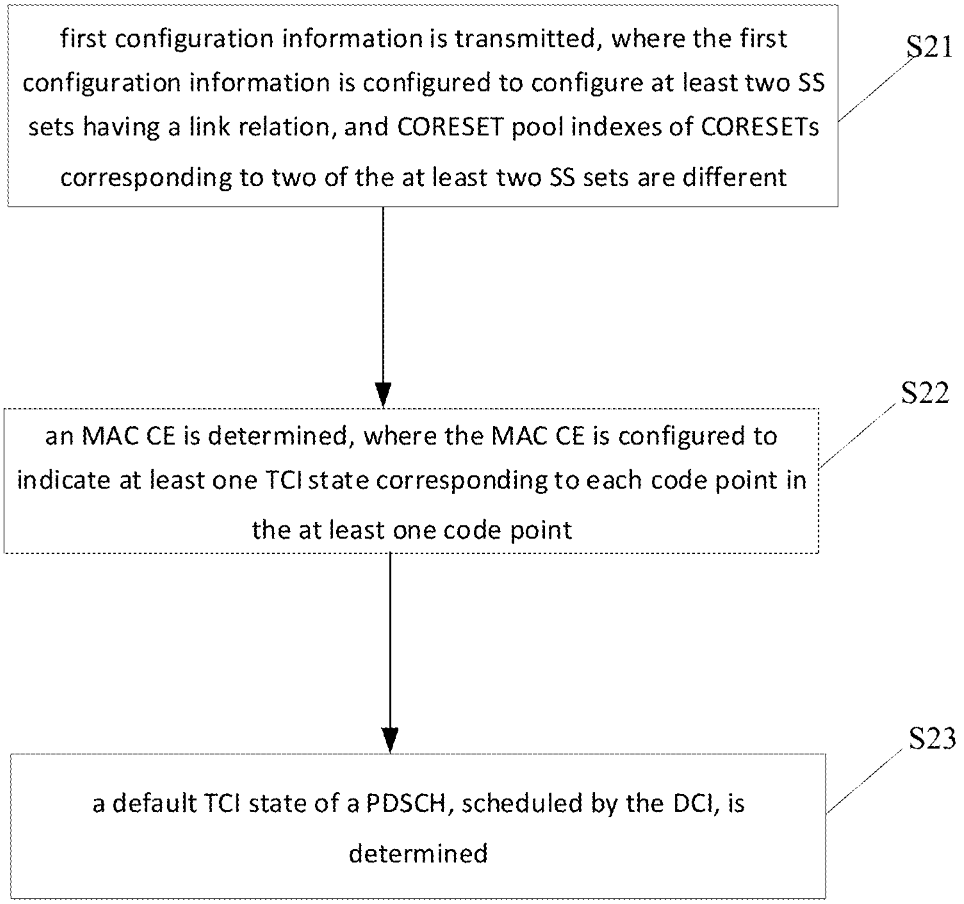
FIG. 5 is a flowchart of a method for configuring a TCI according to an example.

FIG. 5 is a flowchart of a method for determining a TCI state according to an example. As shown in FIG. 5, the method for determining a TCI state is performed by a network device and includes steps S21, S22, and S23.

S21, first configuration information is transmitted, where the first configuration information is configured to configure at least two SS sets having a link relation, and CORESET pool indexes of CORESETs corresponding to two of the at least two SS sets are different.

S22, an MAC CE is determined, where the MAC CE is configured to indicate at least one TCI state corresponding to each code point in the at least one code point.

In response to determining that the at least one code point is configured to appear, the state is carried in a TCI field of DCI, the DCI is transmitted by PDCCH candidates in the at least two SS sets having a link relation.

It should be noted that the at least one code point is configured to appear, which can be understood as the TCI field of the DCI is configured to appear.

S23, a default TCI state of a PDSCH, scheduled by the DCI, is determined.

In the method for determining a TCI state provided in the example of the disclosure, when the CORESET pool indexes of the CORESETs corresponding to the two SS sets in the at least two SS sets are different, the TCI state of the PDSCH scheduled by the DCI can be determined based on the MAC CE, such that the default TCI state can be determined when the CORESET pool indexes of the CORESETs corresponding to the two SS sets in the at least two SS sets are different.

In an embodiment, the default TC state of the PDSCH scheduled by the DCI in the example of the disclosure may be determined based on at least one of a TCI state indicated by the MAC CE, the time duration for QCL, and a time interval between a PDCCH and a PDSCH scheduled by the PDCCH.

In an embodiment, the MAC CE indicates at most one TCI state corresponding to each code point in the at least one code point according to the M-DCI mechanism. When the time interval between the PDCCH and the PDSCH scheduled by the PDCCH is less than the time duration for QCL, the default TCI state of the PDSCH scheduled by the DCI includes a TCI state of a CORESET with a minimum CORESET ID in CORESETs corresponding to the designated CORESET pool index value in the latest time unit in which an SS set needs to be monitored.

The TCI state at least includes QCL Type D, Spatial Rx parameter, etc.

The latest time unit in which an SS set needs to be monitored at least includes one SS set, and a CORESET pool index value of a CORESET associated with the SS set is the designated CORESET pool index value.

In an embodiment, the designated CORESET pool index value includes at least one of A-E, as follows.

A: the designated CORESET pool index value is a first index value, where the first index value is a CORESET pool index of a CORESET corresponding to an SS set having no link relation with any other SS sets.

B: the designated CORESET pool index value is a second index value, where the second index value is different from the CORESET pool index of the CORESET corresponding to the SS set having no link relation with any other SS sets. A CORESET pool index value corresponding to the at least two SS sets having a link relation is the second index value, and alternatively, a CORESET pool index value of a CORESET associated with the at least two SS sets having a link relation is the second index value.

C: the designated CORESET pool index value is a first CORESET pool index value, where the first CORESET pool index value is a CORESET pool index value of a CORESET associated with an SS set corresponding to a first PDCCH candidate. The first PDCCH candidate is a PDCCH candidate whose transmission time or end time is a designated time in at least two PDCCH candidates for transmitting the DCI, and the designated time includes an earliest time or a latest time.

D: the designated CORESET pool index value is a second CORESET pool index value. The second CORESET pool index value is a CORESET pool index value of a CORESET associated with an SS set with a minimum SS set identifier in at least two SS sets.

E: the designated CORESET pool index value is a third CORESET pool index value. The third CORESET pool index value is a CORESET pool index value corresponding to a CORESET with a minimum CORESET identifier in CORESETs associated with the at least two SS sets.

In an embodiment, the MAC CE indicates at most one TCI state corresponding to each code point in the at least one code point, and the time interval between the PDCCH and the PDSCH scheduled by the PDCCH is less than the time duration for QCL. Alternatively, the MAC CE indicates at most two TCI states corresponding to each code point in the at least one code point, the time interval between the PDCCH and the PDSCH scheduled by the PDCCH is less than the time duration for QCL, and enabling two default TCI states is not configured. The default TC state of the PDSCH scheduled by the DCI includes: a TCI state of a CORESET with a minimum CORESET identifier in all CORESETs associated with an SS set in a latest time unit in which the SS set needs to be monitored.

In an embodiment, the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for QCL, and the DCI includes no TCI field. The default TCI state of the PDSCH scheduled by the DCI includes at least one of A or B, as follows.

A: at least one TCI state of at least two TCI states corresponding to the at least two SS sets having a link relation.

B: a TCI state of a first CORESET associated with the at least two SS sets having a link relation, where the first CORESET is a CORESET corresponding to a SS set with a minimum SS set identifier in the at least two SS sets or is a CORESET with a minimum CORESET identifier in CORESETs corresponding to the at least two SS sets.

In an embodiment, the MAC CE indicates at most two TCI states corresponding to each code point in the at least one code point, the time interval between the PDCCH and the PDSCH scheduled by the PDCCH is less than the time duration for QCL, and the terminal is configured to enable two default TCI states. the default TCI state of the PDSCH scheduled by the DCI is a first TCI state, and the first TCI state is two TCI states corresponding to a minimum code point in all code points of two corresponding TCI states indicated by the MAC CE.

In an embodiment, the first MAC CE is configured to indicate at least two TCI states corresponding to at least one code point in the at least one code point; and each of the at least two TCI states is configured for uplink transmission and/or downlink transmission. That is, both of the at least two TCI states are configured for downlink, both of the at least two TCI states are configured for uplink, some of the at least two TCI states are configured for uplink, and some are configured for downlink, or both of the at least two TCI states are configured for uplink and downlink simultaneously.

It can be understood that in the example of the disclosure, downlink includes a downlink channel and/or a downlink signal. Uplink includes an uplink channel and/or an uplink signal.

It can be understood that the method for determining a TCI state performed by the network device in the example of the disclosure corresponds to a method for configuring TCI performed by the terminal. For some places where the description is not detailed enough, reference can be made to some implementation solutions involved on the terminal side, which is not repeated here.

It can be further understood that the method for determining a TCI state provided in the example of the disclosure is applicable to a process in which the terminal interacts with the network device to implement TCI configuration.

It should be noted that those skilled in the art can understand that the various embodiments/examples mentioned above in the examples of the disclosure can be used in conjunction with the foregoing examples, or can be used independently. Whether used independently or in conjunction with the foregoing examples, implementation principles are similar. In the implementation of the disclosure, some examples are described in terms of embodiments used together. Certainly, those skilled in the art will understand that such illustrations are not intended to limit examples of the disclosure.

Based on the same concept, the examples of the disclosure further provide a TCI state apparatus.

It can be understood that in order to achieve the above functions, the TCI state apparatus provided in the example of the disclosure includes a corresponding hardware structure and/or software module for executing each function. The examples of the disclosure may be implemented in hardware or a combination of hardware and computer software, in combination with units and algorithm steps of each instance disclosed in the examples of the disclosure. Whether a certain function is performed by hardware or computer software-driven hardware depends on the particular application of the technical solution and design constraints. Those skilled in the art may use different methods to implement the described functions for each particular application, but such implementation should not be considered to be beyond the scope of the technical solution of the examples of the disclosure.

Figure 6:
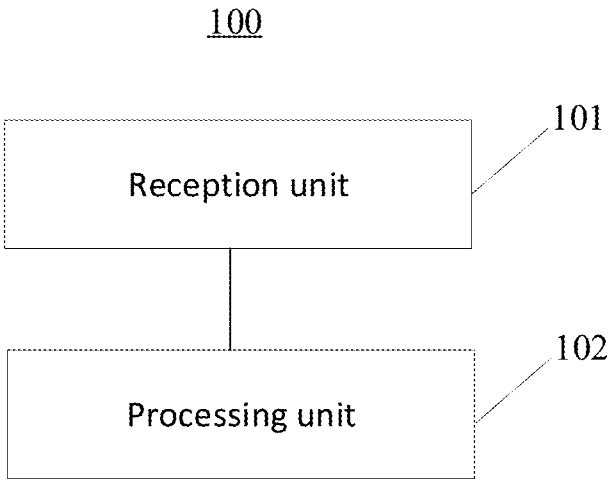
FIG. 6 is a block diagram of an apparatus for configuring a TCI according to an example.

FIG. 6 is a block diagram of an apparatus for determining a TCI state according to an example. With reference to FIG. 6, the apparatus 100 for determining a TCI state may be provided as a terminal. The apparatus 100 for determining a TCI state includes a reception unit 101 and a processing unit 102.

The reception unit 101 is configured to receive first configuration information, where the first configuration information is configured to configure at least two SS sets having a link relation, and CORESET pool indexes of CORESETs corresponding to two of the at least two SS sets are different.

The processing unit 102 is configured to determine an MAC CE, where the MAC CE is configured to indicate at least one TCI state corresponding to each code point in at least one code point, in response to determining that the at least one code point is configured to appear, the state is carried in a TCI field of DCI, and the DCI is transmitted by PDCCH candidates in the at least two SS sets having a link relation. The processing unit 102 is further configured to determine a default TCI state of a PDSCH scheduled by the DCI.

In an embodiment, the default TC state of the PDSCH scheduled by the DCI is determined based on at least one of a TCI state indicated by the MAC CE, a time duration for QCL, or a time interval between a PDCCH and a PDSCH scheduled by the PDCCH.

In an embodiment, the MAC CE indicates at most one TCI state corresponding to each code point in the at least one code point, and the time interval between the PDCCH and the PDSCH scheduled by the PDCCH is less than the time duration for QCL; and alternatively, the MAC CE indicates at most two TCI states corresponding to each code point in the at least one code point, the time interval between the PDCCH and the PDSCH scheduled by the PDCCH is less than the time duration for QCL, and enabling two default TCI state is not configured.

The default TC state of the PDSCH scheduled by the DCI includes a TCI state of a CORESET with a minimum CORESET identifier in CORESETs with the designated CORESET pool index value in the latest time unit in which an SS set needs to be monitored, where the designated CORESET pool index value is the CORESET pool index value of the CORESET associated with the SS set in the time unit.

In an embodiment, the designated CORESET pool index value includes at least one of: the designated CORESET pool index value is a first index value, where the first index value is a CORESET pool index of a CORESET corresponding to an SS set having no link relation with any other SS sets; the designated CORESET pool index value is a second index value, where the second index value is different from the CORESET pool index of the CORESET corresponding to the SS set having no link relation with any other SS sets. A CORESET pool index value corresponding to the at least two SS sets having a link relation is the second index value, and alternatively, a CORESET pool index value of a CORESET associated with the at least two SS sets having a link relation is the second index value; the designated CORESET pool index value is a first CORESET pool index value, where the first CORESET pool index value is a CORESET pool index value of a CORESET associated with an SS set corresponding to a first PDCCH candidate. The first PDCCH candidate is a PDCCH candidate whose transmission time or end time is a designated time in at least two PDCCH candidates for transmitting the DCI, and the designated time includes an earliest time or a latest time; the designated CORESET pool index value is a second CORESET pool index value. The second CORESET pool index value is a CORESET pool index value of a CORESET associated with an SS set with a minimum SS set identifier in at least two SS sets; and the designated CORESET pool index value is a third CORESET pool index value. The third CORESET pool index value is a CORESET pool index value corresponding to a CORESET with a minimum CORESET identifier in CORESETs associated with the at least two SS sets.

In an embodiment, the MAC CE indicates at most one TCI state corresponding to each code point in the at least one code point, and the time interval between the PDCCH and the PDSCH scheduled by the PDCCH is less than the time duration for QCL; and alternatively, the MAC CE indicates at most two TCI states corresponding to each code point in the at least one code point, the time interval between the PDCCH and the PDSCH scheduled by the PDCCH is less than the time duration for QCL, and enabling two default TCI state is not configured.

The default TC state of the PDSCH scheduled by the DCI includes a TCI state of a CORESET with a minimum CORESET identifier in all CORESETs associated with an SS set in the latest time unit in which the SS set needs to be monitored.

In an embodiment, the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for QCL, and the DCI includes no TCI field. Further, the default TCI state of the PDSCH scheduled by the DCI includes at least one of: at least one TCI state of at least two TCI states corresponding to the at least two SS sets having a link relation; and a TCI state of a first CORESET associated with the at least two SS sets having a link relation, where the first CORESET is a CORESET corresponding to a SS set with a minimum SS set identifier in the at least two SS sets or is a CORESET with a minimum CORESET identifier in CORESETs corresponding to the at least two SS sets.

In an embodiment, the MAC CE indicates at most two TCI states corresponding to each code point in the at least one code point, the time interval between the PDCCH and the PDSCH scheduled by the PDCCH is less than the time duration for QCL, and the terminal is configured to enable two default TCI states; and the default TCI state of the PDSCH scheduled by the DCI is the first TCI state, and the first TCI state is two TCI states corresponding to a minimum code point in all code points of two corresponding TCI states indicated by the MAC CE.

In an embodiment, the MAC CE is configured to indicate at least two TCI states corresponding to each code point in the at least one code point; and each of the at least two TCI states is configured for uplink transmission and/or downlink transmission.

Figure 7:
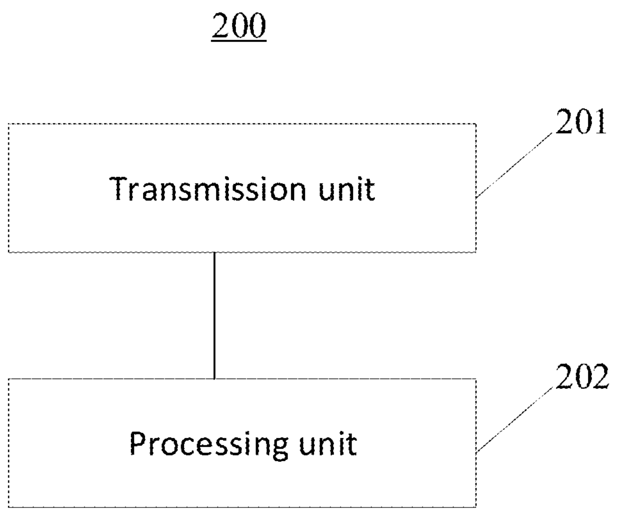
FIG. 7 is a block diagram of an apparatus for configuring a TCI according to an example.

FIG. 7 is a block diagram of an apparatus for determining a TCI state according to an example. With reference to FIG. 7, the apparatus 200 for determining a TCI state may be provided as a network device. The apparatus 200 for determining a TCI state includes a transmission unit 201 and a processing unit 202.

The transmission unit 201 is configured to transmit first configuration information, where the first configuration information is configured to configure at least two SS sets having a link relation, and CORESET pool indexes of CORESETs corresponding to two of the at least two SS sets are different.

The processing unit 202 is configured to determine an MAC CE, where the MAC CE is configured to indicate at least one TCI state corresponding to each code point in at least one code point, in response to determining that the at least one code point is configured to appear, the state is carried in a TCI field of DCI, and the DCI is transmitted by PDCCH candidates in the at least two SS sets having a link relation. The processing unit 202 is further configured to determine a default TCI state of a PDSCH scheduled by the DCI.

In an embodiment, the default TC state of the PDSCH scheduled by the DCI is determined based on at least one of a TCI state indicated by the MAC CE, a time duration for QCL, or a time interval between a PDCCH and a PDSCH scheduled by the PDCCH.

In an embodiment, the MAC CE indicates at most one TCI state corresponding to each code point in the at least one code point, and the time interval between the PDCCH and the PDSCH scheduled by the PDCCH is less than the time duration for QCL; and alternatively, the MAC CE indicates at most two TCI states corresponding to each code point in the at least one code point, the time interval between the PDCCH and the PDSCH scheduled by the PDCCH is less than the time duration for QCL, and enabling two default TCI state is not configured.

The default TC state of the PDSCH scheduled by the DCI includes a TCI state of a CORESET with a minimum CORESET identifier in CORESETs with the designated CORESET pool index value in the latest time unit in which an SS set needs to be monitored, where the designated CORESET pool index value is the CORESET pool index value of the CORESET associated with the SS set in the time unit.

In an embodiment, the designated CORESET pool index value includes at least one of: the designated CORESET pool index value is a first index value, where the first index value is a CORESET pool index of a CORESET corresponding to an SS set having no link relation with any other SS sets; the designated CORESET pool index value is a second index value, where the second index value is different from the CORESET pool index of the CORESET corresponding to the SS set having no link relation with any other SS sets. A CORESET pool index value corresponding to the at least two SS sets having a link relation is the second index value, and alternatively, a CORESET pool index value of a CORESET associated with the at least two SS sets having a link relation is the second index value; the designated CORESET pool index value is a first CORESET pool index value, where the first CORESET pool index value is a CORESET pool index value of a CORESET associated with an SS set corresponding to a first PDCCH candidate. The first PDCCH candidate is a PDCCH candidate whose transmission time or end time is a designated time in at least two PDCCH candidates for transmitting the DCI, and the designated time includes an earliest time or a latest time; the designated CORESET pool index value is a second CORESET pool index value. The second CORESET pool index value is a CORESET pool index value of a CORESET associated with an SS set with a minimum SS set identifier in at least two SS sets; and the designated CORESET pool index value is a third CORESET pool index value. The third CORESET pool index value is a CORESET pool index value corresponding to a CORESET with a minimum CORESET identifier in CORESETs associated with the at least two SS sets.

In an embodiment, the MAC CE indicates at most one TCI state corresponding to each code point in the at least one code point, and the time interval between the PDCCH and the PDSCH scheduled by the PDCCH is less than the time duration for QCL; and alternatively, the MAC CE indicates at most two TCI states corresponding to each code point in the at least one code point, the time interval between the PDCCH and the PDSCH scheduled by the PDCCH is less than the time duration for QCL, and enabling two default TCI state is not configured.

The default TC state of the PDSCH scheduled by the DCI includes a TCI state of a CORESET with a minimum CORESET identifier in all CORESETs associated with an SS set in a latest time unit in which the SS set needs to be monitored.

In an embodiment, the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for QCL, and the DCI includes no TCI field. Further, the default TCI state of the PDSCH scheduled by the DCI includes at least one of: at least one TCI state of at least two TCI states corresponding to the at least two SS sets having a link relation; and a TCI state of a first CORESET associated with the at least two SS sets having a link relation, where the first CORESET is a CORESET corresponding to a SS set with a minimum SS set identifier in the at least two SS sets or is a CORESET with a minimum CORESET identifier in CORESETs corresponding to the at least two SS sets.

In an embodiment, the MAC CE indicates at most two TCI states corresponding to each code point in the at least one code point, the time interval between the PDCCH and the PDSCH scheduled by the PDCCH is less than the time duration for QCL, and the terminal is configured to enable two default TCI states; and the default TCI state of the PDSCH scheduled by the DCI is a first TCI state, and the first TCI state is two TCI states corresponding to a minimum code point in all code points of two corresponding TCI states indicated by the MAC CE.

In an embodiment, the MAC CE is configured to indicate at least two TCI states corresponding to each code point in the at least one code point; and each of the at least two TCI states is configured for uplink transmission and/or downlink transmission.

With respect to the devices in the above examples, the specific ways in which the various modules execute operations are described in detail in the examples relating to the method, and will not be described in detail here.

Figure 8:
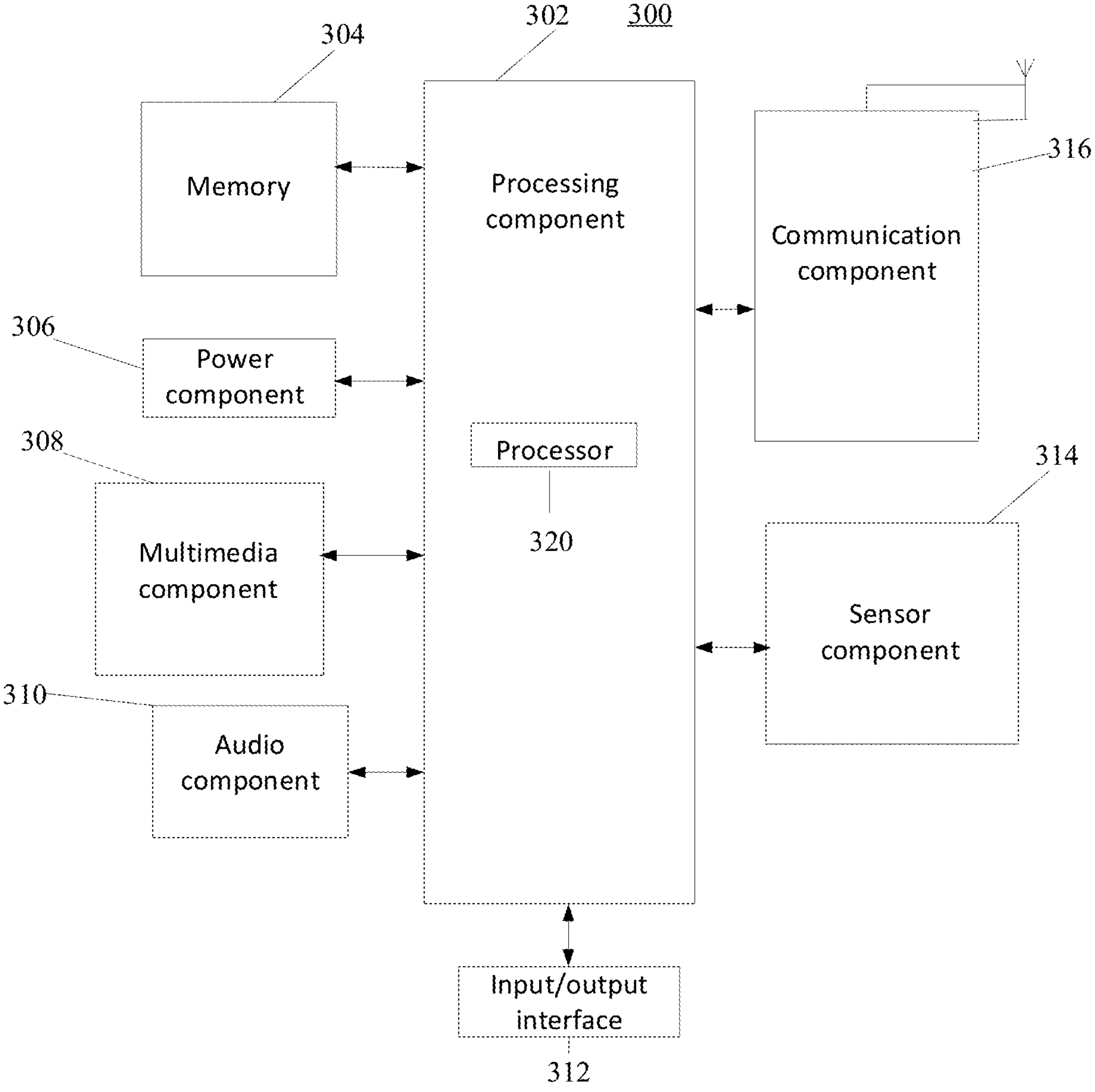
FIG. 8 is a block diagram of an apparatus configured to configure a TCI according to an example.

FIG. 8 is a block diagram of an apparatus 300 for determining a TCI state according to an example. The apparatus 300 may be provided as a terminal. For example, the apparatus 300 may be a mobile phone, a computer, a digital broadcast terminal, a messaging apparatus, a gaming console, a tablet apparatus, a medical apparatus, a fitness apparatus, a personal digital assistant, etc.

With reference to FIG. 8, the apparatus 300 may include one or more of a processing component 302, a memory 304, a power component 306, a multimedia component 308, an audio component 310, an input/output (I/O) interface 312, a sensor component 314, and a communication component 316.

The processing component 302 generally controls the overall operation of the apparatus 300, for example, operations associated with display, phone calls, data communications, camera operations, and recording operations. The processing component 302 may include one or more processors 320 to execute an instruction to complete all or some of the steps of the method above. Moreover, the processing component 302 may include one or more modules to facilitate interaction between the processing component 302 and other components. For example, the processing component 302 may include the multimedia module to facilitate interaction between the multimedia component 308 and the processing component 302.

The memory 304 is configured to store various types of data to support an operation on the apparatus 300. Instances of such data include an instruction, operated on the apparatus 300, for any application or method, contact data, phonebook data, messages, pictures, video, etc. The memory 304 may be implemented by any types of volatile or non-volatile memory devices, or their combinations, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 306 supplies power to the various assemblies of the apparatus 300. The power component 306 may include a power management system, one or more power sources, and other assemblies associated with power generating, managing, and distributing for the apparatus 300.

The multimedia component 308 includes a screen that provides an output interface between the apparatus 300 and the user. In some examples, the screen may include a liquid crystal display (LCD) and a touch panel (TP). If the screen includes a touch panel, the screen may be implemented as a touch screen, so as to receive an input signal from a user. The touch panel includes one or more touch sensors to sense touches, slides, and gestures on the touch panel. The touch sensor may not only sense a boundary of a touch or slide action, but also detect duration and pressure related to the touch or slide operation. In some examples, the multimedia component 308 includes a front-facing camera and/or a rear-facing camera. When the apparatus 300 is in an operational mode, for example, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio component 310 is configured to output and/or input audio signals. For example, the audio component 310 includes a microphone (MIC) configured to receive an external audio signal when the apparatus 300 is in the operational mode, for example, a calling mode, a recording mode, and a speech identification mode. The received audio signal may be further stored in the memory 304 or transmitted via the communication component 316. In some examples, the audio component 310 further includes a speaker for outputting an audio signal.

The I/O interface 312 provides an interface between the processing component 302 and a peripheral interface module, which may be a keyboard, a click wheel, a button, etc. These buttons may include, but are not limited to, a home button, a volume button, a start button, and a lock button.

The sensor component 314 includes one or more sensors for providing state assessments of various aspects for the apparatus 300. For instance, the sensor component 314 may detect an on/off state of the apparatus 300 and the relative positioning of the components. For instance, the components are a display and a keypad of the apparatus 300. The sensor component 314 may also detect a change in position of the apparatus 300 or a component of the apparatus 300, the presence or absence of contact between the user and the apparatus 300, the orientation or acceleration/deceleration of the apparatus 300, and temperature variation of the apparatus 300. The sensor component 314 may include a proximity sensor configured to detect the presence of a nearby object in the absence of any physical contact. The sensor component 314 may also include a light sensor, for example, a complementary metal oxide semiconductor (CMOS) or charge-coupled device (CCD) image sensor, for use in imaging applications. In some examples, the sensor component 314 may further include an acceleration sensor, a gyroscope sensor, a magnetic sensor, a pressure sensor, or a temperature sensor.

The communication component 316 is configured to facilitate communication between the apparatus 300 and other devices in a wired or wireless mode. The apparatus 300 may access a wireless network based on a communication standard, for instance, WiFi, 2G, or 3G, or a combination of them. In an example, the communication component 316 receives a broadcast signal or broadcast-related information from an external broadcast management system by means of a broadcast channel. In an example, the communication component 316 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, or other technologies.

In an example, the apparatus 300 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the method above.

In an example, a non-transitory computer storage medium is further provided, for example, a memory 304 including an instruction. The instruction may be performed by the processor 320 of the apparatus 300 so as to execute the method above. For example, the non-transitory computer-readable storage medium may be a read-only memory (ROM), a random-access memory (RAM), a compact disc read-only memory (CD-ROM), a magnetic tape, a floppy disk, an optical data storage apparatus, etc.

Figure 9:
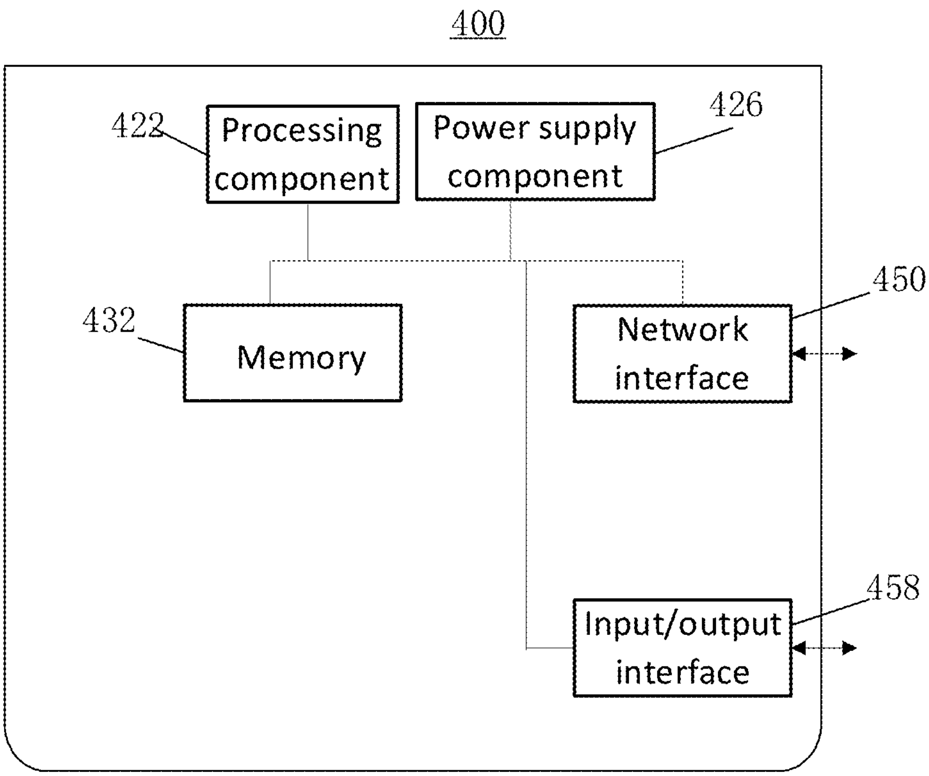
FIG. 9 is a block diagram of an apparatus configured to configure a TCI according to an example.

FIG. 9 is a block diagram of an apparatus 400 for determining a TCI state according to an example. For example, the apparatus 400 may be provided as a network device. With reference to FIG. 9, the apparatus 400 includes a processing component 422, and further includes one or more processors, and memory resources represented by a memory 432 for storing an instruction, for instance, an application program, executable by the processing component 422. The application program stored in the memory 432 may include one or more modules, each of which corresponds to a set of instructions. Further, the processing component 422 is configured to execute the instructions to implement the above method.

The apparatus 400 may further include a power supply component 426 configured to implement power supply management of the apparatus 400, a wired or radio network interface 450 configured to connect the apparatus 400 to a network, and an input/output (I/O) interface 458. The apparatus 400 may operate an operating system stored in the memory 432, such as Windows Server™, Mac OS X™, Unix™, Linux™, FreeBSD™, etc.

In an example, the apparatus 400 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing any of the methods.

In an example, a non-transitory computer storage medium is further provided, for example, a memory 432 including an instruction. The instruction may be performed by the processing component 422 of the apparatus 400 so as to execute the method above. For example, the non-transitory computer-readable storage medium may be a read-only memory (ROM), a random-access memory (RAM), a compact disc read-only memory (CD-ROM), a magnetic tape, a floppy disk, an optical data storage apparatus, etc.

According to a first aspect of the disclosure, a method for determining a TCI state is provided. The method is performed by a terminal, and includes: receiving first configuration information, where the first configuration information is configured to configure at least two search space sets having a link relation, and control resource set pool indexes of control resource sets corresponding to two of the at least two search space sets are different; determining a MAC CE, where the MAC CE is configured to indicate at least one TCI state corresponding to each code point in at least one code point, in response to determining that the at least one code point is configured to appear, the state is carried in a TCI field of downlink control information (DCI), and the DCI is transmitted by physical downlink control channel (PDCCH) candidates in the at least two search space sets having a link relation; and determining a default TCI state of a physical downlink shared channel (PDSCH) scheduled by the DCI.

In an embodiment, the default TCI state of the PDSCH scheduled by the DCI is determined based on at least one of a TCI state indicated by the MAC CE, time duration for quasi co-location, and a time interval between a PDCCH and a PDSCH scheduled by the PDCCH.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TCI state of the PDSCH scheduled by the DCI includes a TCI state of a control resource set with a minimum control resource set identifier in a control resource set with a designated control resource set pool index value in a latest time unit in which a search space set needs to be monitored, where the designated control resource set pool index value is a control resource set pool index value of a control resource set associated with the search space set in the time unit.

In an embodiment, the designated control resource set pool index value includes at least one of: a first index value, where the first index value is a control resource set pool index of a control resource set corresponding to a search space set having no link relation with any other search space sets; a second index value, where the second index value is different from the control resource set pool index of the control resource set corresponding to the search space set having no link relation with any other search space sets, a control resource set pool index value corresponding to the at least two search space sets having a link relation is the second index value, and alternatively, a control resource set pool index value of a control resource set associated with the at least two search space sets having a link relation is the second index value; a first control resource set pool index value, where the first control resource set pool index value is a control resource set pool index value of a control resource set associated with a search space set corresponding to a first PDCCH candidate, the first PDCCH candidate is a PDCCH candidate whose transmission time or end time is a designated time in at least two PDCCH candidates for transmitting the DCI, and the designated time includes an earliest time or a latest time; a second control resource set pool index value, where the second control resource set pool index value is a control resource set pool index value of a control resource set associated with a search space set with a minimum search space set identifier in at least two search space sets; and a third control resource set pool index value, where the third control resource set pool index value is a control resource set pool index value corresponding to a control resource set with a minimum control resource set identifier in control resource sets associated with the at least two search space sets.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TC state of the PDSCH scheduled by the DCI includes a TCI state of a control resource set with a minimum control resource set identifier in all control resource sets associated with a search space set in a latest time unit in which the search space set needs to be monitored.

In an embodiment, the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for quasi co-location, and the DCI includes no TCI field. Further, the default TCI state of the PDSCH scheduled by the DCI includes at least one of: at least one TCI state of at least two TCI states corresponding to the at least two search space sets having a link relation; and a TCI state of a first control resource set associated with the at least two search space sets having a link relation, where the first control resource set is a control resource set corresponding to a search space set with a minimum search space set identifier in the at least two search space sets or is a control resource set with a minimum control resource set identifier in control resource sets corresponding to the at least two search space sets.

In an embodiment, the MAC CE indicates at most two TCI states corresponding to each code point in the at least one code point, the time interval between the PDCCH and the PDSCH scheduled by the PDCCH is less than the time duration for quasi co-location, and the terminal is configured to enable two default TCI states; and the default TCI state of the PDSCH scheduled by the DCI is a first TCI state, and the first TCI state includes two TCI states corresponding to a minimum code point in all code points of the two corresponding TCI states indicated by the MAC CE.

In an embodiment, the MAC CE is configured to indicate at least two TCI states corresponding to each code point in the at least one code point; and each of the at least two TCI states is configured for uplink transmission and/or downlink transmission.

According to a second aspect of the disclosure, a method for determining a TCI state is provided. The method is performed by a network device, and includes: transmitting first configuration information, where the first configuration information is configured to configure at least two search space sets having a link relation, and control resource set pool indexes of control resource sets corresponding to two of the at least two search space sets are different; determining a MAC CE, where the MAC CE is configured to indicate at least one TCI state corresponding to each code point in at least one code point, in response to determining that the at least one code point is configured to appear, the state is carried in a TCI field of downlink control information (DCI), and the DCI is transmitted by physical downlink control channel (PDCCH) candidates in the at least two search space sets having a link relation; and determining a default TCI state of a physical downlink shared channel (PDSCH) scheduled by the DCI.

In an embodiment, the default TCI state of the PDSCH scheduled by the DCI is determined based on at least one of a TCI state indicated by the MAC CE, time duration for quasi co-location, and a time interval between a PDCCH and a PDSCH scheduled by the PDCCH.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TC state of the PDSCH scheduled by the DCI includes a TCI state of a control resource set with a minimum control resource set identifier in a control resource set with a designated control resource set pool index value in a latest time unit in which a search space set needs to be monitored, where the designated control resource set pool index value is a control resource set pool index value of a control resource set associated with the search space set in the time unit.

In an embodiment, the designated control resource set pool index value includes at least one of: a first index value, where the first index value is a control resource set pool index of a control resource set corresponding to a search space set having no link relation with any other search space sets; a second index value, where the second index value is different from the control resource set pool index of the control resource set corresponding to the search space set having no link relation with any other search space sets, a control resource set pool index value corresponding to the at least two search space sets having a link relation is the second index value, and alternatively, a control resource set pool index value of a control resource set associated with the at least two search space sets having a link relation is the second index value; a first control resource set pool index value, where the first control resource set pool index value is a control resource set pool index value of a control resource set associated with a search space set corresponding to a first PDCCH candidate, the first PDCCH candidate is a PDCCH candidate whose transmission time or end time is a designated time in at least two PDCCH candidates for transmitting the DCI, and the designated time includes an earliest time or a latest time; a second control resource set pool index value, where the second control resource set pool index value is a control resource set pool index value of a control resource set associated with a search space set with a minimum search space set identifier in at least two search space sets; and a third control resource set pool index value, where the third control resource set pool index value is a control resource set pool index value corresponding to a control resource set with a minimum control resource set identifier in control resource sets associated with the at least two search space sets.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TC state of the PDSCH scheduled by the DCI includes a TCI state of a control resource set with a minimum control resource set identifier in all control resource sets associated with a search space set in a latest time unit in which the search space set needs to be monitored.

In an embodiment, the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for quasi co-location, and the DCI includes no TCI field. Further, the default TCI state of the PDSCH scheduled by the DCI includes at least one of: at least one TCI state of at least two TCI states corresponding to the at least two search space sets having a link relation; and a TCI state of a first control resource set associated with the at least two search space sets having a link relation, where the first control resource set is a control resource set corresponding to a search space set with a minimum search space set identifier in the at least two search space sets or is a control resource set with a minimum control resource set identifier in control resource sets corresponding to the at least two search space sets.

In an embodiment, the MAC CE indicates at most two TCI states corresponding to each code point in the at least one code point, the time interval between the PDCCH and the PDSCH scheduled by the PDCCH is less than the time duration for quasi co-location, and the terminal is configured to enable two default TCI states; and the default TCI state of the PDSCH scheduled by the DCI is a first TCI state, and the first TCI state includes two TCI states corresponding to a minimum code point in all code points of the two corresponding TCI states indicated by the MAC CE.

In an embodiment, the MAC CE is configured to indicate at least two TCI states corresponding to each code point in the at least one code point; and each of the at least two TCI states is configured for uplink transmission and/or downlink transmission.

According to a third aspect of the disclosure, an apparatus for determining a TCI state is provided. The apparatus includes: a reception unit configured to receive first configuration information, where the first configuration information is configured to configure at least two search space sets having a link relation, and control resource set pool indexes of control resource sets corresponding to two of the at least two search space sets are different; and a processing unit configured to determine an MAC CE, where the MAC CE is configured to indicate at least one TCI state corresponding to each code point in at least one code point, in response to determining that the at least one code point is configured to appear, the state is carried in a TCI field of DCI, the DCI is transmitted by PDCCH candidates in the at least two search space sets having a link relation, and the processing unit is further configured to determine a default TCI state of a PDSCH scheduled by the DCI.

In an embodiment, the default TCI state of the PDSCH scheduled by the DCI is determined based on at least one of a TCI state indicated by the MAC CE, time duration for quasi co-location, and a time interval between a PDCCH and a PDSCH scheduled by the PDCCH.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TC state of the PDSCH scheduled by the DCI includes a TCI state of a control resource set with a minimum control resource set identifier in a control resource set with a designated control resource set pool index value in a latest time unit in which a search space set needs to be monitored, where the designated control resource set pool index value is a control resource set pool index value of a control resource set associated with the search space set in the time unit.

In an embodiment, the designated control resource set pool index value includes at least one of: a first index value, where the first index value is a control resource set pool index of a control resource set corresponding to a search space set having no link relation with any other search space sets; a second index value, where the second index value is different from the control resource set pool index of the control resource set corresponding to the search space set having no link relation with any other search space sets, a control resource set pool index value corresponding to the at least two search space sets having a link relation is the second index value, and alternatively, a control resource set pool index value of a control resource set associated with the at least two search space sets having a link relation is the second index value; a first control resource set pool index value, where the first control resource set pool index value is a control resource set pool index value of a control resource set associated with a search space set corresponding to a first PDCCH candidate, the first PDCCH candidate is a PDCCH candidate whose transmission time or end time is a designated time in at least two PDCCH candidates for transmitting the DCI, and the designated time includes an earliest time or a latest time; a second control resource set pool index value, where the second control resource set pool index value is a control resource set pool index value of a control resource set associated with a search space set with a minimum search space set identifier in at least two search space sets; and a third control resource set pool index value, where the third control resource set pool index value is a control resource set pool index value corresponding to a control resource set with a minimum control resource set identifier in control resource sets associated with the at least two search space sets.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TC state of the PDSCH scheduled by the DCI includes a TCI state of a control resource set with a minimum control resource set identifier in all control resource sets associated with a search space set in a latest time unit in which the search space set needs to be monitored.

In an embodiment, the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for quasi co-location, and the DCI includes no TCI field. Further, the default TCI state of the PDSCH scheduled by the DCI includes at least one of: at least one TCI state of at least two TCI states corresponding to the at least two search space sets having a link relation; and a TCI state of a first control resource set associated with the at least two search space sets having a link relation, where the first control resource set is a control resource set corresponding to a search space set with a minimum search space set identifier in the at least two search space sets or is a control resource set with a minimum control resource set identifier in control resource sets corresponding to the at least two search space sets.

In an embodiment, the MAC CE indicates at most two TCI states corresponding to each code point in the at least one code point, the time interval between the PDCCH and the PDSCH scheduled by the PDCCH is less than the time duration for quasi co-location, and the terminal is configured to enable two default TCI states; and the default TCI state of the PDSCH scheduled by the DCI is a first TCI state, and the first TCI state is two TCI states corresponding to a minimum code point in all code points of two corresponding TCI states indicated by the MAC CE.

In an embodiment, the MAC CE is configured to indicate at least two TCI states corresponding to each code point in the at least one code point; and each of the at least two TCI states is configured for uplink transmission and/or downlink transmission.

According to a fourth aspect of the disclosure, an apparatus for determining a TCI state is provided. The apparatus includes: a transmission unit configured to transmit first configuration information, where the first configuration information is configured to configure at least two search space sets having a link relation, and control resource set pool indexes of control resource sets corresponding to two of the at least two search space sets are different; and a processing unit configured to determine an MAC CE, where the MAC CE is configured to indicate at least one TCI state corresponding to each code point in at least one code point, in response to determining that the at least one code point is configured to appear, the state is carried in a TCI field of DCI, the DCI is transmitted by PDCCH candidates in the at least two search space sets having a link relation, and the processing unit is further configured to determine a default TCI state of a PDSCH scheduled by the DCI.

In an embodiment, the default TCI state of the PDSCH scheduled by the DCI is determined based on at least one of a TCI state indicated by the MAC CE, time duration for quasi co-location, and a time interval between a PDCCH and a PDSCH scheduled by the PDCCH.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TCI state of the PDSCH scheduled by the DCI includes:

a TCI state of a control resource set with a minimum control resource set identifier in a control resource set with a designated control resource set pool index value in a latest time unit in which a search space set needs to be monitored, where the designated control resource set pool index value is a control resource set pool index value of a control resource set associated with the search space set in the time unit.

In an embodiment, the designated control resource set pool index value includes at least one of: a first index value, where the first index value is a control resource set pool index of a control resource set corresponding to a search space set having no link relation with any other search space sets; a second index value, where the second index value is different from the control resource set pool index of the control resource set corresponding to the search space set having no link relation with any other search space sets, a control resource set pool index value corresponding to the at least two search space sets having a link relation is the second index value, and alternatively, a control resource set pool index value of a control resource set associated with the at least two search space sets having a link relation is the second index value; a first control resource set pool index value, where the first control resource set pool index value is a control resource set pool index value of a control resource set associated with a search space set corresponding to a first PDCCH candidate, the first PDCCH candidate is a PDCCH candidate whose transmission time or end time is a designated time in at least two PDCCH candidates for transmitting the DCI, and the designated time includes an earliest time or a latest time; a second control resource set pool index value, where the second control resource set pool index value is a control resource set pool index value of a control resource set associated with a search space set with a minimum search space set identifier in at least two search space sets; and a third control resource set pool index value, where the third control resource set pool index value is a control resource set pool index value corresponding to a control resource set with a minimum control resource set identifier in control resource sets associated with the at least two search space sets.

In an embodiment, the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TC state of the PDSCH scheduled by the DCI includes a TCI state of a control resource set with a minimum control resource set identifier in all control resource sets associated with a search space set in a latest time unit in which the search space set needs to be monitored.

In an embodiment, the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for quasi co-location, and the DCI includes no TCI field. Further, the default TCI state of the PDSCH scheduled by the DCI includes at least one of: at least one TCI state of at least two TCI states corresponding to the at least two search space sets having a link relation; and a TCI state of a first control resource set associated with the at least two search space sets having a link relation, where the first control resource set is a control resource set corresponding to a search space set with a minimum search space set identifier in the at least two search space sets or is a control resource set with a minimum control resource set identifier in control resource sets corresponding to the at least two search space sets.

In an embodiment, the MAC CE indicates at most two TCI states corresponding to each code point in the at least one code point, the time interval between the PDCCH and the PDSCH scheduled by the PDCCH is less than the time duration for quasi co-location, and the terminal is configured to enable two default TCI states; and the default TCI state of the PDSCH scheduled by the DCI is a first TCI state, and the first TCI state is two TCI states corresponding to a minimum code point in all code points of two corresponding TCI states indicated by the MAC CE.

In an embodiment, the MAC CE is configured to indicate at least two TCI states corresponding to each code point in the at least one code point; and each of the at least two TCI states is configured for uplink transmission and/or downlink transmission.

According to a fifth aspect of the disclosure, an apparatus for determining a TCI state is provided. The apparatus includes a processor and a memory configured to store a processor-executable instruction. The processor is configured to execute the method for determining a TCI state in the first aspect or any one of the embodiments of the first aspect.

According to a sixth aspect of the disclosure, an apparatus for determining a TCI state is provided. The apparatus includes a processor and a memory configured to store a processor-executable instruction. The processor is configured to execute the method for determining a TCI state in the second aspect or any one of the embodiments of the second aspect.

According to a seventh aspect of the disclosure, a non-transitory computer storage medium is provided. The storage medium stores an instruction, where the instruction causes the method in the first aspect or any one of the embodiments of the first aspect to be implemented when executed.

According to an eighth aspect of the disclosure, a non-transitory computer storage medium is provided. The storage medium stores an instruction, where the instruction in the storage medium causes the method in the second aspect or any one of the embodiments of the second aspect to be implemented when executed.

The technical solutions provided in the examples of the disclosure may include the following beneficial effects: the MAC CE is determined when the control resource set pool indexes of the control resource sets corresponding to two of the at least two search space sets are different, where the MAC CE is configured to indicate at least one TCI state corresponding to each code point in the at least one code point. Thus, the default TC state of the physical downlink shared channel scheduled by the DCI can be determined based on the MAC CE, such that the default TCI state can be determined when the control resource set pool indexes of the control resource sets corresponding to two of the at least two search space sets are different.

It may be further understood that in the disclosure, "a plurality" refers to two or more, and other quantifiers are analogous. "and/or" is used to describe an associated relationship between associated objects and means three relations, for example, A and/or B may mean A alone, A and B together, and B alone. The character "/" generally indicates that the associated objects are in an "or" relation. Singular forms "a", "an" and "the" are intended to include plural forms as well, unless the context clearly indicates otherwise.

It may be further understood that the terms "first", "second", etc., are used to describe various information, but the information should not be limited by these terms. These terms are merely used to distinguish the same type of information from each other and do not denote a particular order or degree of importance. Indeed, the expressions "first", "second", etc., may be used interchangeably. For example, first information may also be referred to as second information, and similarly, second information may also be referred to as first information, without departing from the scope of the disclosure.

It may be further understood that in examples of the disclosure, while operations are depicted in the drawings in a particular order, it should not be understood as requiring that such operations be executed in the particular order shown or in serial order, or that all illustrated operations be executed, to achieve desirable results. In certain circumstances, multitasking and parallel processing may be advantageous.

Other embodiments of the disclosure will readily occur to those skilled in the art upon consideration of the specification and practice of the disclosure. The present application is intended to cover any variations, uses, or adaptations of the disclosure, and these variations, uses, or adaptations follow general principles of the disclosure and include common general knowledge or customary technical means in the technical field not disclosed in the disclosure.

It should be understood that the disclosure is not limited to the precise structure that has been described above and shown in the accompanying drawings, and that various modifications and changes may be made without departing from its scope. The scope of the disclosure is limited only by the appended claims.

The invention claimed is:

1. A method for determining a transmission configuration indication (TCI) state, performed by a terminal, and comprising:

receiving first configuration information, wherein the first configuration information is configured to configure at least two search space sets having a link relation, and control resource set pool indexes of control resource sets corresponding to two of the at least two search space sets are different;

determining a Medium Access Control Control Element (MAC CE), wherein the MAC CE is configured to indicate at least one TCI state corresponding to each code point in at least one code point, in response to determining that the at least one code point is configured to appear, the state is carried in a transmission configuration indication field of downlink control information (DCI), and the DCI is transmitted by physical downlink control channel (PDCCH) candidates in the at least two search space sets having the link relation; and determining a default TCI state of a physical downlink shared channel (PDSCH) scheduled by the DCI, and wherein the default TCI state of the PDSCH scheduled by the DCI is determined based on a TCI state indicated by the MAC CE, and at least one of time duration for quasi co-location or a time interval between a PDCCH and a PDSCH scheduled by the PDCCH.

2. The method according to claim 1, wherein the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and the terminal is not configured to enable two default TCI states; and the default TCI state of the PDSCH scheduled by the DCI comprises:

a TCI state of a control resource set with a minimum control resource set identifier in the control resource set with a designated control resource set pool index value in a latest time unit in which a search space set needs to be monitored, wherein the time unit at least comprises one search space set, and a control resource set pool index value of a control resource set associated with the search space set is the designated control resource set pool index value.

3. The method according to claim 2, wherein the designated control resource set pool index value comprises at least one of:

a first index value, wherein the first index value is a control resource set pool index of a control resource set corresponding to a search space set having no link relation with any other search space sets;

a second index value, wherein the second index value is different from the control resource set pool index of the control resource set corresponding to the search space set having no link relation with any other search space sets, a control resource set pool index value corresponding to the at least two search space sets having a link relation is the second index value, and alternatively, a control resource set pool index value of a control resource set associated with the at least two search space sets having a link relation is the second index value;

a first control resource set pool index value, wherein the first control resource set pool index value is a control resource set pool index value of a control resource set associated with a search space set corresponding to a first PDCCH candidate, the first PDCCH candidate is a PDCCH candidate whose transmission time or end time is a designated time in at least two PDCCH candidate for transmitting the DCI, and the designated time comprises an earliest time or a latest time;

a second control resource set pool index value, wherein the second control resource set pool index value is a control resource set pool index value of a control resource set associated with a search space set with a minimum search space set identifier in at least two search space sets; or a third control resource set pool index value, wherein the third control resource set pool index value is a control resource set pool index value corresponding to a control resource set with a minimum control resource set identifier in control resource sets associated with the at least two search space sets.

4. The method according to claim 1, wherein the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TCI state of the PDSCH scheduled by the DCI comprises:

a TCI state of a control resource set with a minimum control resource set identifier in all control resource sets associated with a search space set in a latest time unit in which the search space set needs to be monitored.

5. The method according to claim 1, wherein the MAC CE is configured to indicate at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for quasi co-location, and the DCI comprises no transmission configuration indication field; and the default TCI state of the PDSCH scheduled by the DCI comprises at least one of:

at least one TCI state of at least two TCI states corresponding to the at least two search space sets having a link relation; or a TCI state of a first control resource set associated with the at least two search space sets having a link relation, wherein the first control resource set is a control resource set corresponding to a search space set with a minimum search space set identifier in the at least two search space sets or is a control resource set with a minimum control resource set identifier in control resource sets corresponding to the at least two search space sets.

6. The method according to claim 1, wherein the MAC CE indicates at most two TCI states corresponding to each code point in the at least one code point, the time interval between the PDCCH and the PDSCH scheduled by the PDCCH is less than the time duration for quasi co-location, and the terminal is configured to enable two default TCI states; and the default TCI state of the PDSCH scheduled by the DCI is a first TCI state, and the first TCI state include two TCI states corresponding to a minimum code point in all code points of two corresponding TCI states indicated by the MAC CE.

7. The method according to claim 1, wherein the MAC CE is configured to indicate at least two TCI states corresponding to at least one code point in the at least one code point; and each of the at least two TCI states is configured for uplink transmission and/or downlink transmission.

8. A method for determining a transmission configuration indication (TCI) state, performed by a network device, and comprising:

transmitting first configuration information, wherein the first configuration information is configured to configure at least two search space sets having a link relation, and control resource set pool indexes of control resource sets corresponding to two of the at least two search space sets are different;

determining a Medium Access Control Control Element (MAC CE), wherein the MAC CE is configured to indicate at least one TCI state corresponding to each code point in at least one code point, in response to determining that the at least one code point is configured to appear, the state is carried in a transmission configuration indication field of downlink control information (DCI), and the DCI is transmitted by physical downlink control channel (PDCCH) candidates in the at least two search space sets having the link relation; and determining a default TCI state of a physical downlink shared channel (PDSCH) scheduled by the DCI, and wherein the default TCI state of the PDSCH scheduled by the DCI is determined based on a TCI state indicated by the MAC CE, and at least one of time duration for quasi co-location or a time interval between a PDCCH and a PDSCH scheduled by the PDCCH.

9. The method according to claim 8, wherein the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TCI state of the PDSCH scheduled by the DCI comprises:

a TCI state of a control resource set with a minimum control resource set identifier in a control resource set with a designated control resource set pool index value in a latest time unit in which a search space set needs to be monitored, wherein the designated control resource set pool index value is a control resource set pool index value of a control resource set associated with the search space set in the time unit.

10. The method according to claim 9, wherein the designated control resource set pool index value comprises at least one of:

a first index value, wherein the first index value is a control resource set pool index of a control resource set corresponding to a search space set having no link relation with any other search space sets;

a second index value, wherein the second index value is different from the control resource set pool index of the control resource set corresponding to the search space set having no link relation with any other search space sets, a control resource set pool index value corresponding to the at least two search space sets having a link relation is the second index value, and alternatively, a control resource set pool index value of a control resource set associated with the at least two search space sets having a link relation is the second index value;

a first control resource set pool index value, wherein the first control resource set pool index value is a control resource set pool index value of a control resource set associated with a search space set corresponding to a first PDCCH candidate, the first PDCCH candidate is a PDCCH candidate whose transmission time or end time is a designated time in at least two PDCCH candidates for transmitting the DCI, and the designated time comprises an earliest time or a latest time;

a second control resource set pool index value, wherein the second control resource set pool index value is a control resource set pool index value of a control resource set associated with a search space set with a minimum search space set identifier in at least two search space sets; or a third control resource set pool index value, wherein the third control resource set pool index value is a control resource set pool index value corresponding to a control resource set with a minimum control resource set identifier in control resource sets associated with the at least two search space sets.

11. The method according to claim 8, wherein the MAC CE indicates at most one TCI state corresponding to each code point in the at least one code point, and the time interval between the PDCCH and the PDSCH scheduled by the PDCCH is less than the time duration for quasi co-location; and alternatively, the MAC CE indicates at most two TCI states corresponding to each code point in the at least one code point, the time interval between the PDCCH and the PDSCH scheduled by the PDCCH is less than the time duration for quasi co-location, and enabling two default TCI state is not configured; and the default TCI state of the PDSCH scheduled by the DCI comprises:

a TCI state of a control resource set with a minimum control resource set identifier in all control resource sets associated with a search space set in a latest time unit in which the search space set needs to be monitored.

12. The method according to claim 8, wherein the MAC CE indicates at most one TCI state corresponding to each code point in the at least one code point or to indicate at most two TCI states corresponding to each code point in the at least one code point, the time interval between the PDCCH and the PDSCH scheduled by the PDCCH is greater than or equal to the time duration for quasi co-location, and the DCI comprises no transmission configuration indication field; and the default TCI state of the PDSCH scheduled by the DCI comprises at least one of:

at least one TCI state of at least two TCI states corresponding to the at least two search space sets having a link relation; or a TCI state of a first control resource set associated with the at least two search space sets having a link relation, wherein the first control resource set is a control resource set corresponding to a search space set with a minimum search space set identifier in the at least two search space sets or is a control resource set with a minimum control resource set identifier in control resource sets corresponding to the at least two search space sets.

13. The method according to claim 8, wherein the MAC CE indicates at most two TCI states corresponding to each code point in the at least one code point, the time interval between the PDCCH and the PDSCH scheduled by the PDCCH is less than the time duration for quasi co-location, and enabling two default TCI states is configured; and the default TCI state of the PDSCH scheduled by the DCI is a first TCI state, and the first TCI state is two TCI states corresponding to a minimum code point in all code points of two corresponding TCI states indicated by the MAC CE.

14. The method according to claim 8, wherein the MAC CE is configured to indicate at least two TCI states corresponding to each code point in the at least one code point; and each of the at least two TCI states is configured for uplink transmission and/or downlink transmission.

15. A terminal, comprising:

one or more processors; and a memory configured to store a processor-executable instruction;

wherein the processor-executable instruction, when executed by the one or more processors, causes the terminal to:

receive first configuration information, wherein the first configuration information is configured to configure at least two search space sets having a link relation, and control resource set pool indexes of control resource sets corresponding to two of the at least two search space sets are different, determine a Medium Access Control Control Element (MAC CE), wherein the MAC CE is configured to indicate at least one TCI state corresponding to each code point in at least one code point, in response to determining that the at least one code point is configured to appear, the state is carried in a transmission configuration indication field of downlink control information (DCI), and the DCI is transmitted by physical downlink control channel (PDCCH) candidates in the at least two search space sets having the link relation, and determine a default TCI state of a physical downlink shared channel (PDSCH) scheduled by the DCI, and wherein the default TCI state of the PDSCH scheduled by the DCI is determined based on a TCI state indicated by the MAC CE, and at least one of time duration for quasi co-location or a time interval between a PDCCH and a PDSCH scheduled by the PDCCH.

16. A network device, comprising:

one or more processors; and a memory configured to store a processor-executable instruction;

wherein the processor-executable instruction, when executed by the one or more processors, causes the network device to perform the method according to claim 8.

17. A non-transitory computer storage medium, storing an instruction, wherein the instruction, when executed by one or more processors of the terminal, causes the terminal to perform the method according to claim 1.

18. A non-transitory computer storage medium, storing an instruction, wherein the instruction, when executed by one or more processors of the network device, causes the network device to perform the method according to claim 8.

* * * * *